United States Patent
Ennen et al.

(10) Patent No.: US 11,532,304 B2
(45) Date of Patent: Dec. 20, 2022

(54) METHOD FOR CONTROLLING THE OPERATION OF AN APPLIANCE BY A USER THROUGH VOICE CONTROL

(71) Applicant: Miele & Cie. KG, Guetersloh (DE)

(72) Inventors: Volker Ennen, Buende (DE); Thomas Metz, Buende (DE); Daniel Ebke, Bielefeld (DE)

(73) Assignee: MIELE & CIE. KG, Guetersloh (DE)

(*) Notice: Subject to any disclaimer, the term of this patent is extended or adjusted under 35 U.S.C. 154(b) by 260 days.

(21) Appl. No.: 16/908,792

(22) Filed: Jun. 23, 2020

(65) Prior Publication Data

US 2020/0411001 A1 Dec. 31, 2020

(30) Foreign Application Priority Data

Jun. 25, 2019 (DE) ...................... 10 2019 117 064.8
Dec. 18, 2019 (DE) ...................... 10 2019 134 874.9

(51) Int. Cl.
*G10L 15/22* (2006.01)
*H04L 12/28* (2006.01)
*H04B 17/318* (2015.01)
*G06F 3/16* (2006.01)

(52) U.S. Cl.
CPC ............... *G10L 15/22* (2013.01); *G06F 3/167* (2013.01); *H04B 17/318* (2015.01); *H04L 12/282* (2013.01); *G10L 2015/223* (2013.01); *G10L 2015/225* (2013.01); *H04L 2012/285* (2013.01)

(58) Field of Classification Search
CPC ............... G10L 15/22; G10L 2015/223; G10L 2015/225; G10L 15/32; G10L 2015/221; G06F 3/167; H04B 17/318; H04L 12/282; H04L 2012/285; H04L 12/2803
See application file for complete search history.

(56) References Cited

U.S. PATENT DOCUMENTS

| | | | |
|---|---|---|---|
| 7,139,716 B1* | 11/2006 | Gaziz | H04L 12/2803 704/275 |
| 8,250,871 B2 | 8/2012 | Kwon | |
| 2004/0010410 A1* | 1/2004 | Oh | G10L 15/22 704/E15.04 |
| 2004/0203387 A1* | 10/2004 | Grannan | H04L 12/2803 455/41.3 |

(Continued)

FOREIGN PATENT DOCUMENTS

| | | |
|---|---|---|
| DE | 202013007455 U1 | 9/2013 |
| DE | 102017111356 A1 | 11/2018 |

(Continued)

*Primary Examiner* — Afshawn M Towfighi
(74) *Attorney, Agent, or Firm* — Leydig, Voit & Mayer, Ltd.

(57) ABSTRACT

A method for controlling operation of an appliance by a user through voice control includes at least the steps of: detecting, by the appliance, a control action performed by the user on the appliance; activating a voice control system by the appliance; capturing, by the voice control system, a voice input from the user as a captured voice input; recognizing, by the voice control system, a piece of information and/or an instruction in the captured voice input from the user as a recognized information and/or instruction; and executing, by the voice control system, a user control action on the appliance in accordance with the recognized information and/or instruction.

26 Claims, 1 Drawing Sheet

(56) References Cited

U.S. PATENT DOCUMENTS

| | | | |
|---|---|---|---|
| 2013/0073293 A1* | 3/2013 | Jang | G10L 15/22 |
| | | | 704/E21.001 |
| 2014/0207452 A1* | 7/2014 | Klein | G10L 21/10 |
| | | | 704/235 |
| 2014/0354162 A1* | 12/2014 | Sun | H05B 45/10 |
| | | | 315/297 |
| 2015/0019215 A1* | 1/2015 | Shin | G10L 15/20 |
| | | | 704/275 |
| 2017/0004828 A1* | 1/2017 | Lee | G06F 3/012 |
| 2018/0308482 A1* | 10/2018 | Ro | G06F 3/167 |
| 2019/0019515 A1 | 1/2019 | Kim et al. | |
| 2019/0103099 A1* | 4/2019 | Panainte | G10L 15/30 |
| 2019/0130907 A1* | 5/2019 | Joh | G10L 25/21 |

FOREIGN PATENT DOCUMENTS

| | | |
|---|---|---|
| EP | 3 653 093 A1 | 5/2020 |
| WO | WO 014/088333 A1 | 6/2014 |
| WO | WO 2020197062 A1 | 10/2020 |

* cited by examiner

METHOD FOR CONTROLLING THE OPERATION OF AN APPLIANCE BY A USER THROUGH VOICE CONTROL

CROSS-REFERENCE TO PRIOR APPLICATION

Priority is claimed to German Patent Application No. DE 10 2019 117 064.8, filed on Jun. 25, 2019, and to German Patent Application No. DE 10 2019 134 874.9, filed on Dec. 18, 2019. The entire disclosures of the foregoing applications are hereby incorporated by reference herein.

FIELD

The invention relates to a method for controlling the operation of an appliance by a user through voice control and to an appliance for carrying out such a method as described herein.

BACKGROUND

The possibilities for voice control of electronic devices are becoming increasingly widespread today. While it has been known for quite some time to use, for example, the telephone function of a single device, such as an automobile, via the user's voice, and to enter the person or number to be called by voice input, in recent years, the market has seen the introduction of voice-controlled personal assistants which are placed in the home and used there to support the occupants generally and in a variety of ways by voice input. Such voice-controlled personal assistants are wirelessly connected to the Internet, e.g. via a home WLAN, and are thus able to access a wealth of information and make it available to the user upon request.

One example of a known voice-controlled personal assistant is "Amazon Echo" of Amazon.com Inc., which can be activated from a standby mode by inputting various wake words, such as "Alexa" or "Echo," into the device by voice, by pressing a button on the device itself, as well as by using a corresponding remote control and pressing a button thereon, and by a voice input into the remote control. The user can then provide a voice input, to which the voice-controlled personal assistant may respond, depending on the particular application. Typically, the voice-controlled personal assistant responds with a voice output to the voice input from the user.

The functionality of the voice-controlled personal assistant can be enhanced by what is known as skill enhancements, so that, for example, music can be played as well. This also makes it possible to control corresponding smart home appliances which are configured to be controlled via a wireless home network, for example. Examples of other voice-controlled personal assistants currently widely used include "Siri" of Apple Inc. as part of an iPhone, as well as "Cortana" of the Microsoft Corporation as a software for computers with Microsoft operating systems.

In general, known voice-controlled personal assistants typically have to be addressed by the user with a wake word such as, for example, "Alexa," "Siri," or "Cortana" so as to be switched from a standby mode to an active mode. Once in the active mode, the voice-controlled personal assistant waits for voice input of instructions and information from the user in order to process the same and generate corresponding outputs or responses. This may be a feedback or an answer by voice to the user. In the case of a smart home application, for example, it is also possible to turn on, dim, or turn off the light in a room.

If such a voice-controlled personal assistant is to be used to control a household appliance and, in particular, a kitchen appliance, such as a cooktop, so as to initiate a cooking process, then this could be accomplished, for example, with the following voice input from the user: "Alexa, tell Miele cooktop rear left to cook potatoes."

This instruction can be divided into separate parts, which each have a specific meaning:

"Alexa"—wake word to activate the voice-controlled personal assistant; the immediately following words represent a voice command "tell Miele"—selection of a function (skill) of the voice-controlled personal assistant; the following words are to be understood as an instruction to a Miele household appliance "cooktop"—selection of the appliance to be controlled "rear left"—the location within the addressed appliance "cook potatoes"—action of the addressed location.

Thus, the user must create and speak a relatively long sequence of words. It requires some effort from the user to make up this sequence of words. Usually, the order of the parts, as explained above, must be correct in order to achieve the desired operation. Also, the parts must be complete. Furthermore, the user must also speak the made-up sequence of words in this form; i.e., slips of the tongue must be avoided. The sequence of words should also be spoken fluently and without interruption in order to be recognized by the voice-controlled personal assistant as a coherent instruction. This can require quite a bit of concentration from the user and, therefore, may be perceived as uncomfortable and awkward, so the user may refrain from controlling the operation of a household appliance in this way.

Also, the voice-controlled personal assistant must correctly capture the above-mentioned sequence of words. The longer the sequence of words, the more difficult this is to achieve. Furthermore, the voice-controlled personal assistant must correctly process all of the above-mentioned parts of the sequence of words in order to execute the desired operation. This effort, too, as well as the error-proneness of the processing process, increases with the number of words of the sequence of words and with the complexity of the content of the sequence of words. This may result in erroneous operations.

Further, the voice-controlled personal assistant may inform the user that it has not or not completely understood the instruction, so the user must repeat the sequence of words. This may also discourage the user from using this method of controlling the operation of a household appliance.

Overall, such voice-controlled personal assistants have the disadvantage that the wake word or the pressing of a button associated with the device of the voice-controlled personal assistant can only activate the actual voice control and does not provide the voice-controlled personal assistant with any further information regarding the action desired by the user.

SUMMARY

In an embodiment, the present invention provides a method for controlling operation of an appliance by a user through voice control, the method comprising at least the steps of: detecting, by the appliance, a control action performed by the user on the appliance; activating a voice control system by the appliance; capturing, by the voice control system, a voice input from the user as a captured voice input; recognizing, by the voice control system, a piece of information and/or an instruction in the captured voice input from the user as a recognized information and/or instruction; and executing, by the voice control system, a user control action on the appliance in accordance with the recognized information and/or instruction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention facilitates the operation of an appliance by means of a voice-controlled personal assistant. A particular embodiment is to simplify the activation of a voice-controlled personal assistant from standby mode. An additional or alternative embodiment is to shorten the sequence of words required to control an appliance using a voice-controlled personal assistant. Additionally or alternatively, user control of an appliance via a voice-controlled personal assistant should be made easier, faster and/or more intuitive than has been known heretofore. At least an alternative to known voice-controlled personal assistants should be provided.

Thus, the invention relates to a method for controlling the operation of an appliance by a user through voice control, the method including at least the steps of:

detecting, by the appliance, a control action performed by the user on the appliance, activating the voice control system by the appliance, capturing, by the voice control system, a voice input from the user, recognizing, by the voice control system, a piece of information and/or an instruction in the captured voice input from the user, an executing, by the voice control system, a user control action on the appliance in accordance with the recognized information and/or instruction.

In other words, an appliance intended for use by a user is able to recognize a user control action. Such user control action may be any interaction of the user with the appliance to be controlled, including approaching of the user to the appliance, as will be described in more detail further below. "Voice control" may be understood to refer to a voice control unit, which may be implemented as hardware and/or software and adapted to perform a voice control function.

Thus, the activation of the voice control may be caused by the appliance in response to a user control action. Using the voice control, a voice input from the user, for example, in the form of a word, a plurality of interrelated words or a complete sentence, can now be captured, and at least one piece of information or at least one instruction may be recognized therefrom. An instruction may be, for example, the selection of a skill, as described at the outset, or the initiation of an action of the appliance, such as, for example, "roast meat" or "start timer." A piece of information may be, for example, a parameter of an action, such as a power setting, a temperature, a time value of a timer, and the like. The execution of this instruction and/or the use of the information as a user control action on the appliance can then be triggered by the voice control.

The voice control system may completely or partly form part of the appliance to be controlled or may also be partly to completely implemented independently of the appliance to be controlled, as will also be described in more detail further below. In particular, a voice capture component, such as a microphone, may be part of the appliance to be controlled. The captured voice input from the user can then be transmitted, for example, wirelessly to a central voice control unit of, for example, the kitchen, or the home, or house as a whole, which central voice control unit may perform the recognition of the information and/or instruction. Alternatively, a microphone of a central voice control unit may also be used.

In any case, the result of the voice recognition may then be transmitted to the appliance for executing the control thereof, for example, to be executed there by a control unit integral to the appliance. This makes it possible to operate a plurality of appliances as previously described using a single central voice control unit, which may reduce the effort and cost of the voice control as a whole. Such voice control may also be referred to as a voice control system or as a voice assistance system, where the central voice control unit may be, for example, a voice-controlled personal assistant.

The invention is based on the realization that the number of words required from the user to control the appliance by voice can be reduced in this manner. For example, the wake word can be eliminated because the activation of the voice control is effected by a control action performed by the user on the appliance. Moreover, information which has heretofore been spoken to specify the appliance that is to be controlled by the user through voice control can be eliminated because user control is performed on this specific appliance itself. Furthermore, the user control action may already specify a plurality of functions of the appliance, thus also making it possible to reduce the number of the remaining pieces of information that are still to be added via voice control. Such information may thus be limited, for example, to the action of this function of the appliance and the parameters thereof.

In this way, the number of pieces of information that have to be spoken by the user and to be captured, recognized, and executed by the voice control system can be significantly reduced as compared to the known voice control systems described at the outset. This may reduce the effort required of the user and increase the user's acceptance of the voice control system and the voice control function thereof. It is also possible to reduce the complexity of the voice control and its voice recognition. This can also increase the reliability of the voice recognition because less information must be processed.

For example, a movement of the user which is adapted to the typical sequence of operation of an appliance may activate the voice control system and provide it with information which heretofore had to be spoken by the user. It is also possible to provide a combination of different user control options. This allows the user to select the variant that is most convenient in a particular situation.

In the case of a cooktop having a plurality of cooking zones, for example, the method according to the invention may be implemented such that the information about which appliance and which location of the appliance is intended to be used by the user is communicated to the appliance, for example, by actuating a control, for example, a control for the rear left cooking zone. This information can be transmitted by the cooktop to the voice control system, for example, to a voice-controlled personal assistant, which makes it possible to eliminate the heretofore required wake word, the selection of a function, the selection of an appliance, as well as the specification of the location within the appliance.

The voice control can thereby be activated. The following voice command of the user, such as, for example, "potatoes," can be captured, recognized and analyzed by the voice control system. The result of the voice recognition performed by the voice control system can be transmitted to the appliance as a receiver. Here, the command is executed and, for example, the automatic program "potatoes" is started in the rear left cooking zone. In this way, the user can start a cooking program with a simple hand movement and a single word.

The inventive method can also be used for other kitchen appliances, such as, for example, a steam cooker, a baking oven, a microwave oven, or the like. This can be particularly useful in appliances with extensive input options, such as, for example, in appliances having a multiplicity of specialized cooking programs. Here, an action and a word can replace digging through menus for the desired automatic program.

The association between the information and/or instruction recognized by the voice control system from the captured voice input from the user and the appliance intended to be controlled by the user by voice can be established by activating the voice control system by means of a control action performed by the user on this particular appliance. In particular, the voice control may then be deactivated, as will be described in more detail further below, which allows a unique association to be established between a single captured voice input and the appliance that has activated the voice control system. Similarly, in the case that the activated voice control remains activated for a certain period of time to capture additional voice inputs from the user, all of the pieces of information and/or instructions recognized by the voice control from the captured voice inputs from the user can still be associated with the appliance that has activated the voice control in response to a user control action. In this way, too, all of the captured voice inputs can be uniquely associated with a single appliance.

In accordance with an aspect of the invention, the control action performed by the user on the appliance is an additional operation that goes beyond a normal intended use of the appliance. In other words, the user may be required to perform an additional action that serves only to activate the voice control system. This may be done, for example, by pressing a corresponding button, touching a corresponding surface, and the like, as will be described in more detail further below. In this way, it can be ensured that the voice control system will only be activated when desired and deliberately and consciously initiated by the user. Otherwise, the voice control system may remain inactivated, leaving it up to the user to choose whether or not he or she wants to be assisted as previously described.

Alternatively, the control action performed by the user on the appliance is an operation that is part of a normal intended use of the appliance. In other words, a control action that the user performs anyway during the normal intended use of the appliance is additionally used to activate voice control. This may, for example, be the opening or closing of the cooking chamber door of a microwave oven, a baking oven, or of a steam cooker, and the like. In this way, it can be ensured that the user cannot inadvertently forget to activate voice control, and thus voice control is available to the user in any case. This can also save the user from having to activate voice control by an additional action, which may save time and be more comfortable for the user.

In other words, voice control can now be activated even automatically by an input from the user instead of by an additional, special user action. A user operation that is part of a normal intended use of the appliance, such as, for example, the insertion of a food item into the cooking chamber or the opening of the cooking chamber door for this purpose, can be detected by the door sensors and possibly by additional sensors in the appliance. In the case of a cooktop, the user action may, for example, consist in placing a pot, a pan, or any other cooking vessel, or another appliance to be powered via the cooktop, onto the cooktop or changing the position thereof. The following voice command may include, for example, the desired cooking program.

Also possible is a combination with other systems to simplify user control. For example, a system for recognizing food items inserted into the appliance may propose a cooking program based on a camera image or on other sensor systems. If voice control is activated with the appearance of the proposal, this proposal can be accepted, supplemented, or discarded by the user via voice input. If the food recognition system proposes several options, a selection can be made via voice control.

Another example of a potential automatic brief activation of the voice control system is the closing of a lid on a food processor. If, immediately following this user operation as part of a normal intended use, the user speaks a number, then this number can be analyzed by the voice control system as being a speed setting and sent to the food processor. Alternatively or additionally, the temperature or the timer may also be set in this way.

In accordance with a further aspect of the invention, user control of the appliance is performed in a contact-based or contactless manner. Thus, the voice control system may in each case be activated using the different sensory and other options for user control of the appliance in addition or as an alternative to an action of the user.

For example, after closing a built-in appliance, the hand of the user may be located in the upper area of the door or in front of the fascia panel of the appliance. Therefore, it may be suitable to define an action in this area of the appliance as an action to activate voice control. Such an area may be, for example, a touch-sensitive surface on the door or on the control panel, which the user may simply touch with the often relatively clean back of the hand during the cooking process. If this surface is relatively large, it is easier for the user to perform a control action in the flow of movements than in the case of a small touch button. As an alternative to detecting touching of the surface, a capacitive sensor, an IR sensor, a camera, a ultrasonic sensor, or a similar touch-free sensor technology may also be used to detect actuation of the sensor surface by the user. A classic touch button may, of course, also be used as an alternative to the larger surface.

It also possible to use sensors which detect actions other than the normally occurring ones; i.e., actions which go beyond a normal intended use of the appliance. An acceleration sensor and/or a microphone may detect, for example, when the user knocks, or possibly repeatedly knocks, on the appliance, and may use such knocking as an activation signal for the voice control system.

As an alternative to a sensor located, for example, in the door or in the control panel, a sensor may also be integrated into the handle of an appliance. For this purpose, it may be suitable to use, for example, a side surface and/or a region at the end or ends of the handle because these can readily be reached by a hand of the user, but are not touched during normal use. Besides detecting touching of a sensitive surface of the handle, a force measurement, a torque measurement, as well as a measurement of a translational and/or rotational movement may also be used as the signal to be detected. In the case of a flexible attachment of the handle, the force exerted on the handle results in a, possibly minimal, movement of the handle, which can be detected by suitable measures. For example, if a force is exerted laterally on the handle, this may be detected by a sensor and transmitted to a control unit of the appliance as an activation signal for the voice control system. This force may be caused, for example, by the user tapping laterally on the handle. By tapping against one side and against the other side of the handle, two different signals can be generated, for example, to activate and deactivate voice control.

In accordance with another aspect of the invention, the control action performed by the user on the appliance is an approach of the user to the appliance. Thus, if the appliance has a proximity sensor, an approach of the user to the appliance may also activate the voice control system. Alternatively or additionally, an approach of the user to the appliance may also be detected by an image sensor and used to activate the voice control system. For this purpose, it is possible, in particular, to perform face recognition of the user's face so as to allow differentiation between a user passing close to the appliance and a user looking toward the appliance, and to thereby prevent unwanted activation of the voice control system.

In accordance with a further aspect of the invention, the detection of a control action performed by the user on the appliance is accomplished by means of a modular and/or energy-autonomous sensor. The use of a modular sensor may allow for or facilitate retrofitting. To allow for or facilitate retrofitting, it is also possible to use an autonomous system powered by energy harvesting or by a battery or rechargeable battery. Energy harvesting may be accomplished, for example, by means of a solar cell or by recovering energy from the temperature differences between the inward portion of the handle or glass pane, which is warm during operation, and the relatively cold side facing away from the appliance. Energy may also be recovered from the movement of, for example, the door of the appliance. The transmission of data may be via a wireless connection such as BTLE or Wi-Fi. Alternatively, wired solutions may also be employed for power supply and/or communication. Parts of the wiring may be provided by conductive coatings on the door, for example.

In accordance with another aspect of the invention, the method includes, upon activation of the voice control system, at least the further step of:

indicating, by the appliance, the activated voice control system.

The activation of the voice control system may be audibly and/or visually and/or haptically indicated to the user on the appliance and/or on a separate component of the voice control system. Such an indication may be made using existing indicators specifically provided for this purpose, such as, for example, backlit icons, icons on a display, or text on a display, and the like. Alternatively or additionally, a circuit for driving components intended for other purposes, such as, for example, the cooking chamber light, may be used to indicate the activity of the voice control system, for example by variations in color, by flashing in response to activation or deactivation. Alternatively or additionally, the activation of the voice control system may be indicated haptically, for example by brief vibration of the handle of the appliance.

In accordance with a further aspect of the invention, the method includes, upon capturing a voice input from the user, at least the further step of:

outputting feedback in response to the captured voice input from the user.

This allows the user to receive feedback from the voice control system as to what has been captured as a voice input from the user or as to whether the user's desired voice input has been correctly recognized by the voice control system. The result of the voice recognition performed by the voice control may be indicated to the user using, for example, a display or icons on the appliance, for example by the message: "automatic potato program." Alternatively or additionally, the recognized command may also be output audibly by the voice control system, for example, by repeating the content of the voice input from the user or by a corresponding acknowledgement in the form of a voice output.

It is also possible to require the user to provide confirmation by making another voice input or a different input prior to the execution of the recognized voice command. Depending on the appliance and on the command, such confirmation may be mandatory, optional, or not available. For example, the turn-off of the appliance or a reduction in temperature may only be fed back to the user without requiring confirmation, whereas the turn-on or a significant increase in temperature must be confirmed.

In accordance with another aspect of the invention, the execution, by the voice control system, of a user control action on the appliance occurs after a predetermined time delay. In other words, a delay may be inserted before the execution of the voice command so as to provide the user with an option for abortion or correction in the event that his or her voice command has been incorrectly recognized by the voice recognition system. The amount of the predetermined time delay may be a general default setting or be dependent on the appliance to be operated, the operation of the appliance and/or on the voice input from the user. For example, the command "turn off the appliance" may be executed immediately, while the command "220° C. convection air" is not executed until a delay of several second has elapsed.

In accordance with a further aspect of the invention, the method includes, upon capturing a voice input from the user, at least the further step of:

outputting information and/or an instruction to another device.

This enables involvement of additional systems which may use the information and/or the instruction. Thus, the information obtained by the voice control system from the control action performed by the user on the appliance in combination with the voice input from the user, such as "potato program is started on rear left cooking zone," is not only sent to the cooktop, but at the same time also to a cooking assistance system, for example on a tablet or in a cloud. Based on this information and/or instruction, the cooking assistance system may display the next step in the cooking process. The forwarding of the information and/or instruction may be effected by the cooking appliance, by the voice control system, or by a central entity.

An example of such a procedure is as follows: An app containing a step-by-step guide for cooking a plurality of food items in built-in cooking appliances is running on a tablet. Two built-in cooking appliances are available. The user inserts a food item into the first built-in cooking appliance and activates, with a touch, the sensor unit that is located in the handle of the first built-in appliance and connected to the first built-in appliance. The first built-in appliance then sends the command "activate voice recognition" to an external device of the voice control system or activates the integrated voice control of the first built-in appliance. A brief flashing of the cooking chamber light indicates to the user that the voice recognition of the voice control system of the first built-in appliance is active. The user says: "roast meat." The voice recognition system recognizes the command "roast meat" and sends it to the first built-in appliance for execution.

If no cooking assistance system is available, the first built-in appliance offers the user several options for preparing a roast in the first built-in appliance. These options include automatic programs, size of the roast, type of meat, and the like. If an assistance system is available, the first built-in appliance sends the information "roast meat" to the assistance system. The assistance system responds with the parameters contained in the recipe for the roast beef cooking process. Depending on the configuration, the first built-in appliance displays these parameters to the user for conformation, or starts the cooking program directly with these parameters. Upon receipt of the feedback from the first built-in appliance or after the cooking process is started, the assistance system integrates the display of the initiated cooking process with a countdown timer and an indication of the built-in appliance being used. Since the information about which built-in appliance is being used is available because voice input is activated on the first built-in appliance, there is no need to select the built-in appliance in the assistance system.

In accordance with another aspect of the invention, the method includes, upon execution by the voice control system of a user control action on the appliance, at least the further step of:

deactivating, by the appliance, the activated voice control.

In this way, the activated voice control system can be deactivated by the appliance so that the previously described voice control functions will no longer be unnecessarily available or used. In particular, the appliance may deactivate the voice control system as soon as it has executed or initiated the user control action on the appliance in accordance with the recognized information or instruction. It is also possible that the voice control system may be active only as long as the user is performing control actions, for example only as long as the user touches a particular surface on the control panel or on the handle of a built-in appliance.

In this way, the voice control system can be kept from being operated longer than necessary. This makes it possible, for example, to minimize the resources required for data transfer within the appliance or from the appliance to the voice control system and back. Also, the data processing performed by the voice control system can be kept to a minimum. This allows data traffic through wireless or wired links to be kept to a minimum, especially in the case of a voice control system that is not only available to the appliance to be controlled, but also to other appliances. In particular, the voice control system can be prevented from capturing further voice outputs of the user and from attempting to recognize such voice outputs and, possibly, executing commands on this basis or requesting the user to confirm such commands. This may result in erroneous operations or may be perceived as annoying by the user.

In accordance with another aspect of the invention, the method includes, upon execution by the voice control system of a user control action on the appliance, at least the further step of:

maintaining the activated voice control system for a predetermined period of time.

In other words, the duration of activation of the voice control system may have a predetermined length of time. In this way, the voice recognition of the voice control system may be activated by the user and then remain available to the user for a predetermined period without the need for the user to, for example, permanently touch a particular surface on the control panel or on the handle of a built-in appliance. This can make voice input easier for the user, and thus increase the ease of use.

In accordance with a further aspect of the invention, the voice control system forms part of the appliance. In other words, the voice control may be integrated as a unit and/or as software into the appliance to be controlled. This may simplify data transfer. Also, the voice control system may be tailored to the functions, programs, parameters, etc. that can actually be used on the appliance. This may simplify voice control.

In accordance with another aspect of the invention, the voice control system is independent of the appliance. In other words, the voice control system (e.g., as a voice-controlled personal assistant) may constitute a separate device, which may be used for voice recognition in a variety of ways and may carry out the inventive method as one of its functions through interaction with the appliance to be controlled. This makes it possible to use a voice control system for multiple appliances and applications, which may reduce the number of different voice control systems for a plurality of appliances in a home, for example.

In other words, voice recognition and voice analysis may be performed by means of an external device, such as with an Amazon Echo, a HomePod, a Google Home, and the like. If an external device is used, communication may take place via the device or directly between, for example, a sensor with a wireless module in the handle of the appliance to be controlled and an external device of the voice control system. Alternatively, the communication may be forwarded to the external device via the appliance to be controlled. In this case, the appliance to be controlled may function as a translator or intermediary between the sensor unit and different external devices with different protocols for voice control.

An example of such a procedure is as follows: A built-in appliance is connected in signal communication with a device for voice control. The built-in appliance has a sensor element in the handle of a cooking chamber door, which sensor element permits wireless communication using a first wireless standard and a first protocol. The built-in appliance may now translate the first protocol into a second protocol and perform a wireless communication to the voice recognition device using a second wireless standard so as to transfer the data in the second protocol from the sensor element to the voice recognition device. If the data from the sensor element are to be transferred to another voice recognition device using a third protocol and a third wireless standard, this translation may also be performed by the built-in appliance.

In accordance with a further aspect of the invention, the appliance is a household appliance, preferably a kitchen appliance. In this way, the previously described features and advantages can be used in a home, especially in combination with a voice-controlled personal assistant as described at the outset. In particular, besides the above-mentioned household or kitchen appliances, such as cooktop, steam cooker, baking oven, microwave oven, other household appliance, such as refrigerator, dishwasher, washing machine, dryer, exhaust hood, and the like, may also be used in accordance with the invention.

In accordance with another aspect of the invention, via the activation step, a plurality of voice control systems are activated by the appliance, and via the capturing step, a voice input from the user is captured by at least one voice control system of the plurality of voice control systems.

This aspect of the invention is based on the realization that a plurality of voice control systems, such as several tablets, smartphones, as well as voice assistants, and the like, may be present in a home. These voice control systems or voice input devices may be permanently associated with a room or with one or more appliances to be controlled, which is usually not the case because of the resulting inflexibility in everyday use. A voice control system which is rather intended for stationary use, such as Alexa, could in principle be used in the kitchen. As an example, cooktop, baking oven, steam cooker, and exhaust hood all access a common voice assistant in the kitchen. In contrast, the washing machine and the dryer are associated with another voice assistant in the utility room.

However, mobile voice control systems, such as tablets or smartphones, are typically used in different rooms within a home as well as outside of a home. For example, when the user enters the kitchen, he or should would have to associate such an appliance with the kitchen or a kitchen appliance, and to log it off when leaving the kitchen. This would require additional effort from the user and, therefore, could be perceived as annoying. Moreover, a voice control system that is intended rather for stationary use could be moved to another room without being logged off from the previous room and logged on to the new room, which could make it more difficult or impossible for this voice control system to perform the step of capturing a voice input from the user.

Therefore, in accordance with the present aspect of the invention, a more flexible approach could be to activate, by the appliance to be controlled, all voice control systems that are associated with, for example, a home and located, for example, in the same WLAN, and to wait for an executable command. In this way, the previously described disadvantages could be avoided or at least reduced. At the same time, it would be possible to eliminate the need of associating voice control systems with an appliance to be controlled or with an area of the home, such as, for example, the kitchen, and thereby avoid a decrease in user convenience.

In this connection, in order to increase the voice recognition reliability of the plurality of voice control systems, such as Siri on the smartphone, Amazon Alexa cloud service in communication with a microphone in a kitchen appliance, and Google Home Nest Hub, which can be selectively activated and operated in parallel, the respective voice recognition results may be merged, for example, in a cloud or in the appliance to be controlled. The association between the captured voice inputs of a plurality of voice control systems and possibly a plurality of appliances to be controlled can be accomplished by mechanisms which will be described further below.

When merging the results of the voice recognition performed by a plurality of voice control systems on the same captured voice input from the user, a plausibility check may be performed as to whether the pieces of information and/or the instructions recognized have the same or at least a similar content. In the case of deviations, different strategies may be employed. For example, the voice command may be rejected and the user may be requested to repeat his or her voice input. However, the information and/or instruction may also be selected based on a majority decision if at least two voice control systems have recognized the same information and/or instruction from a particular captured voice input. Moreover, the results of a particular captured voice input may be weighted with the previous success probability of the deviating voice control systems. It is also possible to pursue different strategies, depending on the potential hazard associated with the recognized information and/or instructions. For example, a cooktop may only be turned on or set to a higher power level when the available voice control systems are in unambiguous agreement, whereas the light of an exhaust hood may be turned on even when the voice control systems are in disagreement, but have a tendency toward the safe information and/or instruction.

In accordance with a further aspect of the invention, via the capturing step, a plurality of voice inputs from a plurality of users are in each case captured by at least one voice control system, and via the step of recognizing a piece of information and/or an instruction in the captured voice inputs from the users, the information and/or instruction is in each case recognized as such or discarded by at least one voice control system.

This aspect of the invention is based on the idea that the aforedescribed activation of a plurality of voice control systems may result in that user voice inputs which are actually not intended for the operation of the appliance to be controlled may be captured as well. Therefore, in accordance with the invention, the content of all captured voice inputs may be analyzed and it may be identified, in particular in the context of the appliance to be controlled, which of the captured voice inputs serve for the operation of the appliance to be controlled and which do not. For example, if the term "colored wash" is contained in a captured voice input, it may be recognized from the context that this term can be suitably executed as an instruction, for example, in a washing machine, but not in a steam cooker or a cooktop.

For example, if a particular cooking zone of a cooktop is activated by the cookware item located thereon, it may be recognized therefrom that in order to select a power setting for this cooking zone, a numerical value is to be expected as a captured voice input. If now words other than numerical values are recognized from the captured voice inputs of all activated voice control systems, then these words can be discarded or ignored. Thus, only the first numerical value captured is a valid captured voice input and is used by the voice control system to execute a user control action on the appliance in accordance with the recognized information and/or instruction.

Additional approaches to the problem of protection against confusing voice inputs when voice inputs are made to different voice control systems in temporally close proximity may include that a safety mode having additional safety rules may be activated if multiple pieces of information or instructions are captured by multiple voice control systems in temporally close proximity. This may include additional checks or confirmation requests for potentially hazardous instructions, such as a change in the power setting of a cooking zone, for example, or additional plausibility checks where there is a risk of erroneous rejection of the instruction and which, for this reason, are normally not activated.

In this way, both information and/or instructions can be checked for plausibility. If one of the two pieces of information and/or instructions is not plausible, the implausible information and/or instruction may be rejected.

Also, recognition of the appliance to be controlled may be accomplished by considering the history of the information and/or the instructions, establishing a short-range wireless link, such as Bluetooth, by signal strength measurements, by a non-audible signal, as well as through various combinations thereof, as will be described in more detail further below.

In accordance with another aspect of the invention, the captured voice inputs of one voice control system are prioritized over the captured voice inputs of the at least one further voice control system.

This aspect of the invention is based on the realization that when multiple voice inputs from multiple users are captured by at least one voice control system as previously described, the voice control system may, on the one hand, accidentally record conversations as captured voice inputs and thereby violate the privacy of the users. On the other hand, the contents of such conversations may erroneously be interpreted as commands, which may affect the safety of the appliance to be controlled. For example, if, as described above, a numerical value is expected to be captured as a voice input for selecting a power setting of a cooking zone, while, in this moment, a numerical value is captured, e.g., in the children's room, by a voice control system located there, then the voice input captured in the children's room could accidentally be used to select the power setting of the cooking zone in the kitchen.

Another potential source of error, which arises when multiple voice inputs are captured, may be that two voice control systems could be activated almost simultaneously. In this case, if attention is only paid to the timing of the captured voice inputs, the temporal overlapping of two captured voice inputs may result in incorrect association thereof. To continue with the previous example, if one numerical value is spoken in the kitchen and one numerical value is spoken in the children's room at about the same time, then the numerical value spoken in the children's room may be erroneously used to control the cooking zone if this voice input is captured and analyzed first.

The easiest way to avoid this would be to deactivate the voice recognition function for all other voice control systems in the network or in the home when one voice control system is to be used to control an appliance in the home. However, the users of the other voice control systems could perceive this as restrictive and annoying, especially if the appliance to be controlled is to be voice-controlled over a longer period of time, such as in the case of a cooking zone or a cooktop being used to cook a meal with various ingredients. During this time, Alexa, for example, would not be available to answer questions, play music, and the like. In particular, it may be anticipated that increasing numbers of appliances to be controlled will be integrated into a network of voice control systems. This would also increase the number of collisions of the type described above, which could be perceived as annoying by the users.

Therefore, in accordance with this aspect of the invention, all voice control systems may, in fact, be activated, and the captured voice inputs may initially be stored in a buffer, but one voice control system may be prioritized, as it were, as a primary voice control system, over the at least one further voice control system based on, for example, the history of the voice inputs that have previously been captured and executed. It is not until the primary voice control system no longer captures any executable instructions that the captured voice inputs of the at least one further voice control system are considered.

This association can be used both in the case that multiple voice control systems are activated by a control operation performed on one appliance, and in the case that multiple voice control systems are activated successively by control operations performed on at least two appliances. The automatic association between the voice control system and the appliance to be controlled can be established, for example, based on the last information and/or instruction that has been unambiguously associated. Thus, for example, the voice control system that has captured the last unambiguously associated information and/or instruction for the steam cooker as the appliance to be controlled may be used as the primary device for a voice input after a trigger from the steam cooker.

In accordance with a further aspect of the invention, a plurality of appliances and/or a plurality of voice control systems are present, with one appliance being associated with one voice control system. This association can be established, in particular, by a fixed selection that the user can make and preferably also change on the appliance and/or on the voice control system.

This aspect of the invention is based on the realization that appliances which, for example, have similar capabilities, such as a steam cooker and a baking oven, and are located close together cannot be clearly distinguished by their functions, and neither via the captured voice inputs. These appliances may, for example, use temperature settings in a comparable temperature range, as well as execute comparable cooking functions or cooking programs. Thus, if both appliances are used or controlled at the same within the kitchen using a common voice control system or using multiple voice control systems, then a captured voice input containing a numerical value, for example, may be used as a cooking temperature instruction by each of the appliances and can therefore possibly not be clearly associated with the steam cooker or with the baking oven.

In such a case, simultaneous activation of the steam cooker and the baking oven would actually be very unlikely and would easily be interpreted as a user error because in order for this to happen, two users would have to stand close together, to activate the voice function by an action in the field of view of the respective other user, and to interrupt each other with their voice commands. Nevertheless, the residual risk for the occurrence of such a scenario can be reduced or even eliminated when a voice control system, such as Alexa, in the kitchen is permanently associated with, for example, the steam cooker as the appliance to be controlled while another voice control system, such as a smartphone of the user, is permanently associated with, for example, the baking oven as the further appliance to be controlled, or when the baking oven is not associated with any voice control system at all. In this way, captured voice inputs in the kitchen can be clearly associated with the steam cooker by Alexa, while the baking oven may be voice-controlled by the user via the smartphone or operated by the user without voice control.

This can allow for unique association of the captured voice inputs, even when multiple appliances and/or multiple voice control systems are present. In particular, it is possible to prevent accidental capture of conversations in other rooms, such as could occur if multiple voice control systems were activated as previously described by the appliance to be controlled, although this may offer other advantages as previously described.

On the other hand, this permanent association of the appliance to be controlled with a voice control system may involve additional effort for the user, as previously described. However, this may be justified by the corresponding advantages, such as enhanced safety of operation and/or enhanced privacy protection, and may be considered by the user to be worth the additional effort.

In accordance with another aspect of the invention, distance detection is performed to detect the distance between the associated appliance and the voice control system, at least the activation of the voice control system by the appliance occurring only if the associated appliances and voice control systems are detected to be within a predetermined distance from one another.

This aspect of the invention is based on the consideration that if the voice control system is removed, for example, from the kitchen and set up, for example, in the children's room, the voice control system in the children's room may be activated and the spoken text may be captured. On the one hand, this may disturb the privacy in the children's room. On the other hand, the voice inputs captured in the children's room may be used to control, for example, a cooking zone in the kitchen if this voice control system is associated with the cooktop. As a result of this, error messages may be output in the kitchen or the cooktop may be caused to operate, which may affect safety. Furthermore, the cooktop cannot be controlled by voice inputs in the kitchen because the correspondingly associated voice control system is outside of the reach of the user located in the kitchen.

Therefore, in accordance with the invention, distance detection may be performed to detect the distance between the associated appliances and voice control systems, and these may only be operated together by voice input as previously described if the required spatial proximity is maintained. For this purpose, it would be possible to determine the distance between the appliance to be controlled and the associated voice control system using, e.g. a short-range wireless technology, such as Bluetooth. For example, the range of a Bluetooth connection could be sufficient within a kitchen, but not sufficient to cover the distance from the appliance to be controlled in a kitchen to the associated voice control system, e.g., in the living room, in the children's room, or in the laundry room. The voice control system can only be activated for voice input when a Bluetooth connection can be established between the appliance to be controlled and the associated voice control system.

If a plurality of appliances located in a room, e.g., the kitchen, are interconnected by a WLAN, but not all of them support the required short-range wireless technology, then the distance determination may also be performed using this technology as a substitute. In this way, the probability of erroneous inputs and accidental activation of the voice control system can at least be reduced. If multiple appliances are within reach, it may nevertheless be possible to activate multiple appliances, as the case may be.

If a group of appliances are associated with one voice control system, the distance determination may preferably be performed by the activated appliance. If there are multiple neighboring appliances in a kitchen, this function may be performed by another appliance of the group.

In accordance with a further aspect of the invention, the associated voice control system determines a signal strength of a signal emitted by the appliance, at least the activation of the voice control system by the appliance occurring only if the determined signal strength is equal to or greater than a predetermined value.

This aspect of the invention is based on the realization that a short-range wireless technology, such as Bluetooth, can work even through walls. It is therefore not possible to positively distinguish whether the voice control system associated with the appliance is located in the same room as the appliance or in a separate room within the wireless range of the appliance. For example, special cases are conceivable where the wireless connection of the appliance to a voice control system on the other side of a plasterboard wall is better than the wireless connection to the associated voice control system that is located on the other side of a large coffee maker, a microwave oven, and the like, on the countertop of the kitchen.

Therefore, the aforedescribed distance determination between the appliance to be controlled and voice control system can be improved by measuring the signal strength of a wireless signal, such as Bluetooth, WLAN, and the like. This makes it possible to further reduce the number of errors. In particular, in combination with the consideration of the most recent appliance-specific information and/or instructions, it is already possible to significantly reduce the error rate as compared to parallel analysis of all scraps of speech detected by all voice control systems within reach.

In accordance with a another aspect of the invention, the appliance transmits at least one additional piece of information to the associated voice control system, at least the activation of the voice control system by the appliance occurring only if the transmitted additional piece of information is captured by the associated voice control system.

In other words, the appliance to be controlled may transmit a short signal, e.g., in the non-audible range, to the associated voice control system, which signal may also be detected by the voice recognition system and may be transmitted, e.g. as a code, along with the information and/or instruction resulting from the captured voice input from the user. This allows the information and/or instruction to be clearly associated as a voice message with the appliance to be controlled without the need for temporal association. The temporal association between the activation of the voice control system by the appliance to be controlled and the arrival of the voice message at the appliance to be controlled may be used for plausibility checking as an additional safety feature.

In the case that an audible signal is detected in multiple rooms, then a sound-level measurement may be performed analogously to, e.g., the measurement of the field strength of the wireless signal. The sound signal, which is acoustically transmitted in parallel to the voice control system and directly to a cloud via encrypted data transmission, and which differs from use to use, can be used as a kind of two-way authentication and thus at least as a weak defense against simple replay hacker attacks.

The present invention also relates to an appliance, preferably a household appliance, particularly preferably a kitchen appliance, for carrying out a method for controlling the operation of an appliance by a user through voice control as previously described, the appliance being adapted to detect a control action performed by the user on the appliance, the appliance further being adapted to activate the voice control system, the voice control system being adapted to capture a voice input from the user, the voice control system further being adapted to recognize a piece of information and/or an instruction in the captured voice input from the user, and the voice control system further being adapted to execute a user control action on the appliance in accordance with the recognized information and/or instruction. Thus, an appliance can be provided that allows the inventive method and its features and advantages to be implemented and used as previously described.

Figure 1:
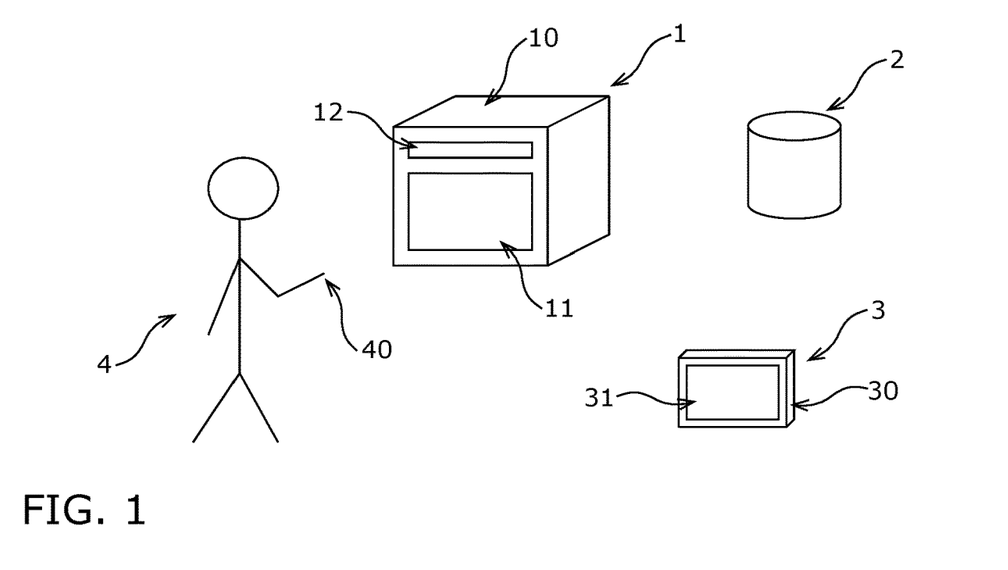
FIG. 1 is a schematic representation showing an appliance to be controlled, a voice control system, a further device, as well as a user.

In FIG. 1, there is shown an appliance 1 to be controlled, which takes the form of a household appliance 1, namely a kitchen appliance 1, such as a steam cooker 1. Steam cooker 1 has a housing 10 providing a cooking chamber therein, which is accessible via an access opening. This access opening can be closed by a cooking chamber door 11. A control panel 12 is disposed above cooking chamber door 11. Control panel 12 has various input elements as well as a display to allow a user 4 different ways to control the operation the steam cooker 1, e.g., through the selection of programs and parameterization thereof, or by manual setting of, e.g., a cooking time, a cooking temperature, and the like, and to control the food cooking process.

Provision is also made for voice control 2, which may also be referred to as voice control system 2 or voice assistance system 2. In particular, voice control 2 may be a voice-controlled personal assistant 2, such as an Amazon Echo, which is connected in signal communication with steam cooker 1.

Also provided is a further device 3 in the form of a tablet 3, which has a housing 30 with a display and control element 31 in the form of a touch screen 31. Touch screen 31 is capable of displaying information, such as instructions for preparing a recipe, to user 4, and of receiving inputs from user 4. User 4 can make such inputs with the fingers of a hand 40. Tablet 3 is also connected in signal communication with steam cooker 1 and with voice-controlled personal assistant 2.

Figure 2:
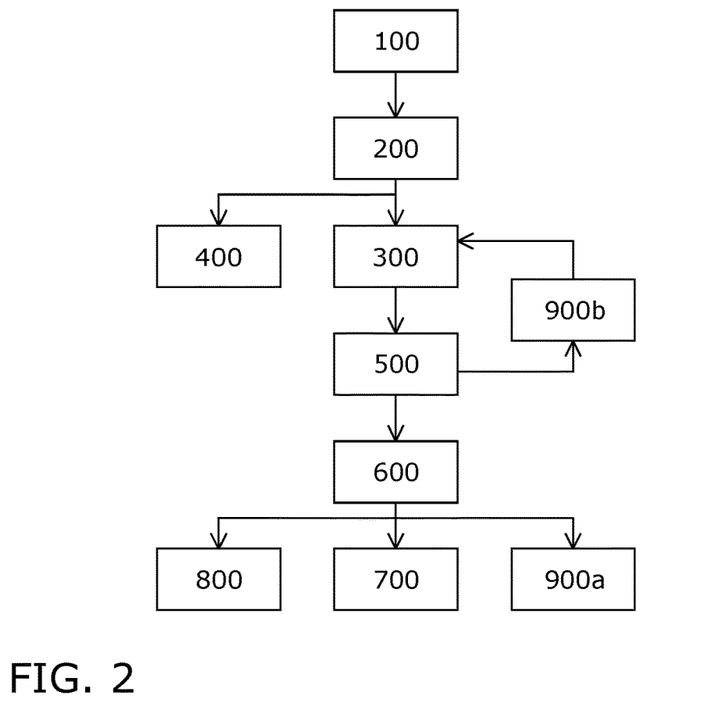
FIG. 2 is a schematic flow chart of a method according to the invention.

A method according to the invention, shown in FIG. 2, can be carried out by steam cooker 1, voice-controlled personal assistant 2, tablet 3, and user 4 as follows:

Initially, steam cooker 1 detects 100 a control action performed by user 4 on steam cooker 1. This may be accomplished, for example, by steam cooker 1 detecting when cooking chamber door 11 of steam cooker 1 is opened. This may be accomplished by a sensor in the attachment mechanism of cooking chamber door 11 or by the breaking of an electrically conductive contact. The opening of cooking chamber door 11, as a control action performed by user 4, allows steam cooker 1 to itself detect that user 4 wishes to use steam cooker 1.

In response to this, steam cooker 1 activates 200 voice-controlled personal assistant 2. To this end, steam cooker 1 may send to voice-controlled personal assistant 2 an activation signal or an activation command which not only replaces the otherwise common wake word (e.g., "Alexa"), but, in addition, also contains the information that steam cooker 1 was operated by user 4.

Accordingly, voice-controlled personal assistant 2 may now awake from a standby mode and activate its microphone so that a voice input from user 4 can be captured 300 by voice-controlled personal assistant 2.

At the same time, activated voice-controlled personal assistant 2 may be indicated 400 by steam cooker 1. This may be done, for example, by illuminating a corresponding icon of the control panel 12. Alternatively or additionally, for example, the cooking chamber light, which has already been turned on by the opening of cooking chamber door 11, may flash repeatedly. In either case, user 4 can thus be made aware that he or she can now make a voice input to voice-controlled personal assistant 2 in order to use steam cooker 1.

Accordingly, voice-controlled personal assistant 2 may recognize 500 a piece of information and/or an instruction in the captured voice input from user 4. To this end, the previously captured voice input from user 4 may be analyzed by voice-controlled personal assistant 2, and the content of the voice input may be recognized through voice recognition. This content may be, for example, a piece of information, such as a desired temperature setting for the operation of steam cooker 1. Additionally or alternatively, the voice input from user 4 may also contain an instruction indicating, for example, a particular cooking program to be used.

In order to allow user 4 to check whether his or her voice input has been correctly recognized by voice-controlled personal assistant 2, feedback about the recognized voice input from user 4 may be output 600. For example, the recognized information and/or the recognized instruction may be output by voice by voice-controlled personal assistant 2.

Then, voice-controlled personal assistant 2 may execute 700 a user control action on steam cooker 1 in accordance with the recognized information and/or instruction. To this end, voice-controlled personal assistant 2 may send corresponding information or instructions by wireless signal transmission to steam cooker 1 so that steam cooker 1 can proceed accordingly. Thus, this can be done as an alternative to a manual input option for user 4 via control panel 12 of steam cooker 1.

In this connection, the wireless signal transmission from voice-controlled personal assistant 2 to steam cooker 1 may be delayed by voice-controlled personal assistant 2 in order to wait and see if user 4 makes further inputs that would also have to be taken into account. It is also possible to wait and see if user 4 corrects or repeats his or her voice input in response to the feedback provided by voice-controlled personal assistant 2 on the voice input in case the voice input has not been correctly recognized by voice-controlled personal assistant 2 and therefore needs to be corrected by user 4.

A piece of information and/or an instruction may be output 800 to tablet 3 in parallel to the wireless signal transmission from voice-controlled personal assistant 2 to steam cooker 1. This makes is possible, for example, to proceed to a another step of a recipe that user 4 wants to prepare using steam cooker 1.

After the wireless signal transmission from voice-controlled personal assistant 2 to steam cooker 1 is complete, voice-controlled personal assistant 2 may be directly deactivated 900a by steam cooker 1. This may occur especially if steam cooker 1 detects that all of the information and all instructions required to perform a cooking process are available and thus no further control inputs from user 4 are needed.

It is also possible to maintain 900b voice-controlled personal assistant 2 for a predetermined period of time in order to allow user 4 to make further voice inputs. This may be the case especially if not all of the information and instructions required to perform a cooking process are available yet and, therefore, further control inputs from user 4 are needed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS (PART OF THE DESCRIPTION)

1 appliance to be controlled; household appliance to be controlled; kitchen appliance to be controlled; steam cooker
10 housing
11 cooking chamber door
12 control panel
2 voice control; voice control system; voice assistance system; voice-controlled personal assistant
3 further device; tablet
30 housing
31 display and control element; touch screen
4 user
40 hand of user 4
100 detecting, by appliance 1, a control action performed by user 4 on appliance 1
200 activating voice control system 2 by appliance 1
300 capturing, by voice control system 2, a voice input from user 4
400 indicating activated voice control system 2 by appliance 1
500 recognizing, by voice control system 2, a piece of information and/or an instruction in the captured voice input from user 4
600 outputting feedback in response to a captured voice input from user 4
700 executing, by voice control system 2, a user control action on appliance 1 in accordance with the recognized information and/or instruction
800 outputting information and/or an instruction to another device 3
400 deactivating activated voice control system 2 by appliance 1
900b maintaining activated voice control system 2 for a predetermined period of time

What is claimed is:

1. A method for controlling operation of an appliance by a user through voice control, the method comprising at least the steps of:
    detecting, by the appliance, a control action performed by the user on the appliance, the control action comprising the user's physical interaction with the appliance or the user's physical approach toward the appliance;
    activating a voice control system by the appliance;
    capturing, by the voice control system, a voice input from the user as a captured voice input;
    recognizing, by the voice control system, a piece of information and/or an instruction in the captured voice input from the user as a recognized information and/or instruction; and
    executing, by the voice control system, a user control action on the appliance in accordance with the recognized information and/or instruction, the user control action comprising a plurality of functions for controlling operation of the appliance.

2. The method as recited in claim 1, wherein the control action performed by the user on the appliance comprises an additional operation that goes beyond a normal intended use of the appliance, or
    wherein the control action performed by the user on the appliance is an operation that is part of a normal intended use of the appliance.

3. The method as recited in claim 1, wherein the control action performed by the user on the appliance is performed in a contact-based or contactless manner.

4. The method as recited in claim 1, wherein the control action performed by the user on the appliance comprises an approach of the user to the appliance.

5. The method as recited in claim 1, wherein detection of a control action performed by the user on the appliance is accomplished by a modular and/or energy-autonomous sensor.

6. The method as recited in claim 1, further comprising:
    after activating the voice control system, indicating, by the appliance, the activated voice control system.

7. The method as recited in claim 1, further comprising:
    after capturing a voice input from the user, outputting feedback in response to the captured voice input from the user.

8. The method as recited in claim 1, wherein execution, by the voice control system, of a user control action on the appliance occurs after a predetermined time delay.

9. The method as recited in claim 1, further comprising:
    after capturing a voice input from the user, outputting information and/or an instruction to another device.

10. The method as recited in claim 1, further comprising:
    after executing, by the voice control system, a user control action on the appliance, deactivating, by the appliance, the activated voice control system.

11. The method as recited in claim 1, further comprising:
    after executing, by the voice control, a user control action on the appliance, maintaining the activated voice control system for a predetermined period of time.

12. The method as recited in claim 1, wherein the voice control system forms part of the appliance.

13. The method as recited in claim 1, wherein the voice control system is independent of the appliance.

14. The method as recited in claim 1, wherein the appliance comprises a household appliance.

15. The method as recited in claim 1, wherein via the activating, a plurality of voice control systems are activated by the appliance, and
    wherein via the capturing step, a voice input from the user is captured by at least one voice control system of the plurality of voice control systems.

16. The method as recited in claim 15, wherein via the capturing, a plurality of voice inputs from a plurality of users are in each case captured by at least one voice control system, and wherein via the recognizing the piece of information and/or the instruction in the captured voice inputs from the users, the information and/or instruction is in each case recognized as such or discarded by at least one voice control system.

17. The method as recited in claim 16, wherein the captured voice inputs of one voice control system are prioritized over the captured voice inputs of the at least one further voice control system.

18. The method as recited in claim 1, wherein a plurality of appliances and/or a plurality of voice control systems are present, with one or more appliances being associated with a voice control system.

19. The method as recited in claim 18, wherein distance detection is performed to detect a distance between at least one of the associated appliances and the voice control system, and
wherein at least activating of the voice control system by the appliance occurs only if the associated appliances and voice control systems are detected to be within a predetermined distance from one another.

20. The method as recited in claim 1, wherein distance detection is performed to detect a distance between at least one appliance and a plurality of voice control systems, and
wherein at least the activating of the voice control system by the appliance occurs only for the voice control system that has the least distance from the activated appliance.

21. The method as recited in claim 18, wherein the associated voice control system determines a signal strength of a signal emitted by the appliance, or
wherein the appliance determines a signal strength of a signal emitted by the associated voice control system, at least the activating of the voice control system by the appliance occurring only if the determined signal strength is equal to or greater than a predetermined value.

22. The method as recited in claim 18, wherein the appliance determines a signal strength of one or more signals emitted by a plurality of voice control systems, and
wherein at least the activating of the voice control system by the appliance occurs only for the voice control system that has a highest signal relative to a known output signal strength of the signal of the voice control system.

23. The method as recited in claim 19, wherein the appliance transmits at least one additional piece of information to the associated voice control system, and
wherein at least the activating of the voice control system by the appliance occurs only if the transmitted additional piece of information is captured by the associated voice control system.

24. An appliance for carrying out the method according to claim 1, the appliance being configured to detect the control action performed by the user on the appliance and to activate the voice control system,
wherein the voice control system is configured to capture the voice input from the user as the captured voice input, recognize the piece of information and/or the instruction in the captured voice input from the user as the recognized information and/or instruction, and execute the user control action on the appliance in accordance with the recognized information and/or instruction.

25. The method as recited in claim 20, wherein at least the activating of the voice control system by the appliance occurs only for the voice control system that does not exceed a maximum distance.

26. The appliance as recited in claim 24, wherein the appliance comprises a household appliance.

* * * * *